United States Patent [19]

Teater

[11] Patent Number: 4,550,226

[45] Date of Patent: Oct. 29, 1985

[54] SUBSCRIBER'S TELEPHONE CIRCUIT ARRANGED TO PRESENT CONSTANT IMPEDANCE TO A TELEPHONE LINE

[75] Inventor: Albert G. Teater, Huntsville, Ala.

[73] Assignee: GTE Communication Systems Corporation, Northlake, Ill.

[21] Appl. No.: 648,098

[22] Filed: Sep. 7, 1984

Related U.S. Application Data

[63] Continuation-in-part of Ser. No. 490,932, May 2, 1983, abandoned.

[51] Int. Cl.⁴ ............................................. H04M 1/60
[52] U.S. Cl. .................................. 179/81 R; 179/81 B
[58] Field of Search ................ 179/81 R, 81 A, 81 B, 179/100 L, 16 F

[56] References Cited

U.S. PATENT DOCUMENTS

| | | | |
|---|---|---|---|
| 3,529,099 | 9/1970 | Ribner | 179/81 R |
| 3,789,155 | 1/1974 | Fensom | 179/81 A |
| 4,167,655 | 9/1979 | Hestad et al. | |
| 4,303,805 | 12/1981 | Synek et al. | 179/81 R |
| 4,354,060 | 10/1982 | Niertit et al. | 179/81 R |
| 4,359,609 | 11/1982 | Apfel | 179/16 F |
| 4,400,588 | 8/1983 | Stobbs et al. | 179/16 F X |
| 4,495,382 | 1/1985 | Smith et al. | 179/81 R |
| 4,503,289 | 3/1985 | Spires | 179/16 F |

FOREIGN PATENT DOCUMENTS 2072465 9/1981 United Kingdom ............ 179/81 R

Primary Examiner—Keith E. George
Attorney, Agent, or Firm—Robert J. Black; Gregory G. Hendricks

[57] ABSTRACT

A transformerless telephone circuit including an integrated circuit pulse dialer and transmit, receive and ringer circuitry employing discrete components. Included in the transmit, receive and dialer circuitry are fixed resistive components, which in combination with each other present a constant impedance to said telephone line.

7 Claims, 5 Drawing Figures

SUBSCRIBER'S TELEPHONE CIRCUIT ARRANGED TO PRESENT CONSTANT IMPEDANCE TO A TELEPHONE LINE

This application is a continuation-in-part of my co-pending application Ser. No. 490,932 filed on May 2, 1983 now abandoned.

CROSS REFERENCE RELATED APPLICATION

U.S. patent applications, Ser. Nos. 490,934, 490,935 and 490,936 filed on the same date as the above noted co-pending application are related to the present application.

BACKGROUND OF THE INVENTION

1. Technical Field

The present invention relates to transformerless subscriber's telephone circuits and more particularly to a subscriber's telephone circuit employing both integrated circuit elements and discrete components in an active gain circuit arrangement.

2. Background Art

Since the advent of integrated circuit technology, numerous efforts have been made to reduce telephone design programs by the utilization of two or three integrated circuit devices. The objectives of such design programs have been to achieve low cost, high reliability and an increased number of usable features. The provision of an increased number of features has to a great extent been successful. For example, such designs permit the use of pushbutton dialing when connected to telephone offices which are configured to accept only rotary dial type telephones.

However, it should be noted that other objectives have been only partly achieved. This is for the most part due to very stringent circuit requirements found in telephone ciruitry. A conventional telephone circuit for example, would usually be required to operate from a variable supply voltage, withstand both current and voltage surges, provide analog and digital functions and signal through its own power supply circuit. Consequently, most telephone circuits commercially available to date employ several discrete electronic components to support the incorporated integrated circuit based designs.

While integrated circuit technology has been progressing in the direction required for telephone designs over the last few years, substantial improvements have also been made in the discrete semiconductor technology field. Such improvements include a wider variety of low cost transistors and diodes, as well as lower cost resistors and capacitors.

Prior to the advent of semiconductor technology, conventional subscriber's telephones employed circuitry including a hybrid transformer to perform a two-wire to four-wire conversion. This conversion is an essential function of all two-wire analog telephones. During this same period, voltage dependent resistors (varistors) had been used extensively to support such hybrid designs. Varistors were used to provide automatic ajustment of transmit and receive levels and to compensate for various loop lenghts (longer loops requiring higher transmit levels and higher receive sensitivity). An undersirable consequence of utilization of the varistor/transformer type of circuitry is the presence of a variable AC impedance between the ring and tip (L1 and L2) terminals of the telephone. It is actually much more desirable to have a fixed AC impedance (600 Ohms) telephone connected to a line so as to maximize the return loss which, in turn, reduces voice signal transmission problems within the telephone system.

One of the first portions of subscriber telephone circuitry to be successfully adapted to the utilization of integrated circuit technology is the pulse dialng portion. Such pulse circuitry typically employs pushbutton inputs to generate pulse outputs. Units of this sort usually draw their power from the telephone line. Most designs of this type employ a current regulator device or current limiting device to prevent dial pulse distortion during dialing. Such pulse distortion is caused by supplying too much loop current to the pulse dialer integrated circuit while trying to maintain a minimum operating voltage for satisfactory integrated circuit operation. Such techniques are disclosed in U.S. Pat. No. 4,167,655 as well as in British Pat. No. 1,426,585.

Accordingly, the object of the present invention is to provide a new and improved subscriber's telephone circuit which employs an optimal combination of discrete and integrated circuit components to overcome many of the disadvantages found in prior art subscriber telephone circuits.

SUMMARY OF THE INVENTION

The present invention consists of a subscriber telephone circuit incorporating an electronic tone ringer (for call alerting), integrated circuitry for loop current interrupt dial signalling and transistorized transmit and receive amplifiers associated with an electret microphone and a dynamic receiver unit respectively. A three terminal piezoelectric ringer transducer is employed in connection with electronic tone ringer circuitry. The design of the transmit and receive amplifier is such that the terminal impedance of the telephone circuit is approximately 600 Ohms (AC). The integrated circuit pulse dialer incorporates as a standard feature re-dial of the last number dialed. Also included are a transmit mute switch and ringer output level high-low switch.

With the exception of the pulse dialer integrated circuit, the present telephone circuitry is of the bi-polar transistor type. The pulse dialer integrated circuit is of the complementary-metal-oxide-semiconductor (CMOS) type which can be operated while drawing only a negligible amount of current from the telephone line.

The disclosed telephone circuit performs the two-wire to four-wire conversion function by use of a unique operational amplifier which merely cancels the side tone signal thus separating the transmit and receive channels. The result in the present design is the replacement of a large iron core transformer with a smaller and lower cost transistor circuit.

The disclosed subscriber telephone circuit provides a terminal AC impedance of approximately 600 Ohms (±100 Ohms) under all loop conditions as compared to the 300–1200 Ohms found under all loop conditions for some more traditional varistor/hybrid transformer type of circuitry. The stable impedance of the present design is established by resistor value selection and is achieved by use of high impedance transmit and receive amplifiers. Since these amplifiers do not shunt the terminal of the telephone, the impedance is determined by specific shunt resistors. The value of these resistors is not dependent on loop conditions. These resistors are included in the transmit, receive and dialer circuitry.

While the pulse dialer portion of the present circuit is similar in many respects to those found in current production, it does not employ a current limiting device or current regulator to prevent dial pulse distortion during dialing. As noted above, this pulse distortion is caused by supply of excess loop current to the pulse dialer in order to maintain a minimum operating voltage for satisfactory integrated circuit operation. The present circuitry employs a large (100 microfarad) capacitor to keep voltage above the minimum value for pulse dialer integrated circuit operation during dial pulse interruptions of the line.

The electronic tone ringer portion of the present circuitry employs a bi-polar transistor oscillator circuit including a three terminal piezoelectric transducer. One of the terminals is a feedback tap which provides the regenerative effect necessary for oscillation. The oscillator circuit operates from the output of a full wave rectifier without a supply filter capacitor. This technique permits the ringing voltage frequency to set the interruption rate of the oscillator which provides a more effective alerting signal. The circuit thus is more economical than many found in the prior art, in that no interruption oscillator is required. As a convenience feature, a "high-low-off" switch is incorporated in the present design to select the acoustical output of the ringer unit. With high level selected, the output level is greater than 70 dB and is reduced by more than 6 dB when the low position is selected.

Also included in the present subscriber's circuit is a diode bridge which acts as a polarity guard. A hookswitch of conventional design provides the usual "on/off-hook" conditions. A transmit mute switch blocks voice transmissions while still admitting incoming signals. A simple re-dial switch actuates the last number dial feature in the pulse dialer, while a PNP high voltage transistor is employed as the actual dial pulsing switch and a metallic oxide varistor is utilized as a voltage surge suppressor for the protection of susceptible electornic devices.

DESCRIPTION OF THE PREFERRED EMBODIMENT

Figure 1:
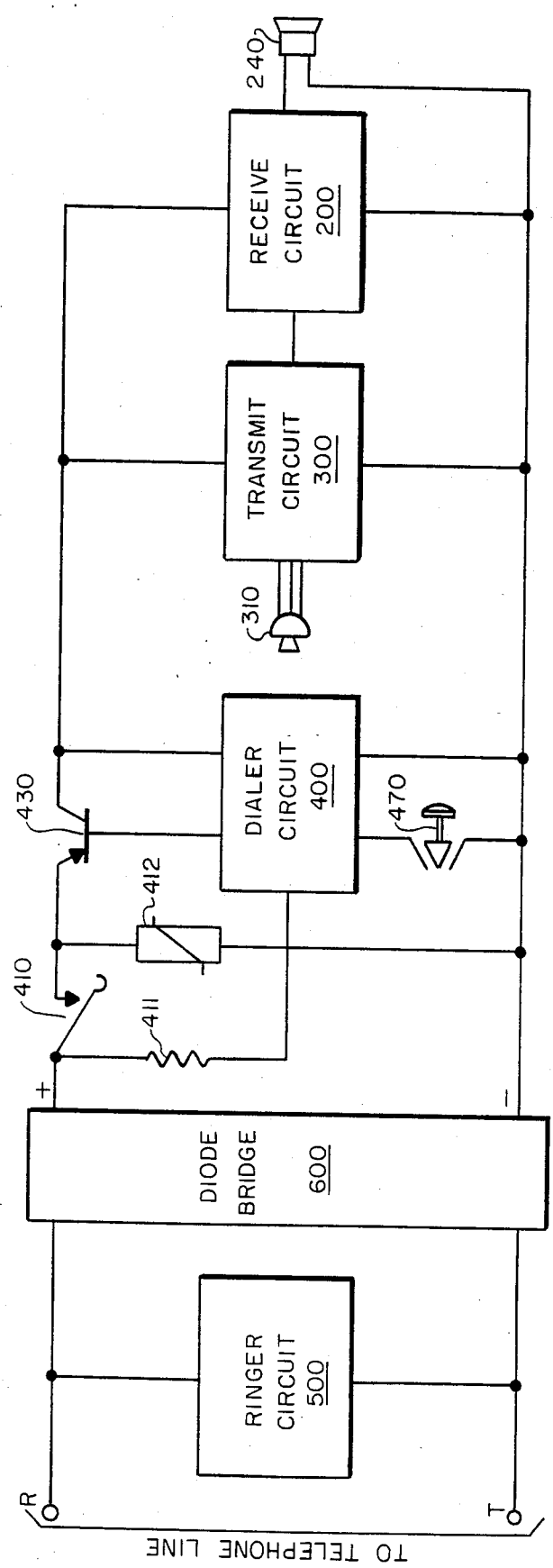
FIG. 1 is a simplified combination block and schematic diagram of the subscriber's telephone circuit in accordance with the present invention.

Referring now to FIG. 1 a simplified block diagram of a subscriber's telephone circuit in accordance with present invention is shown. The basic functional elements are a receive circuit 200, a transmit circuit 300, a pulse dialer circuit 400 and a ringer circuit 500. For transducers, an electret microphone 310 is associated with transmit circuit 300 and an encapsulated dynamic speaker 240 is associated with receive circuit 200. A piezoelectric resonator attached to an associated Helmholtz resonator cavity (not shown) may be associated with a ringer circuit 500. Auxillary elements include voltage surge suppressor 412 (a metallic oxide varistor), diode bridge 600 which provides polarity protection, hookswitch 410, re-dial switch 470 and transistor 430 which functions as the dial pulse switch. As will be noted from FIG. 1, all the basic functional elements include circuit connections to terminals T and R which are adapted for connection to a telephone line.

Figure 2:
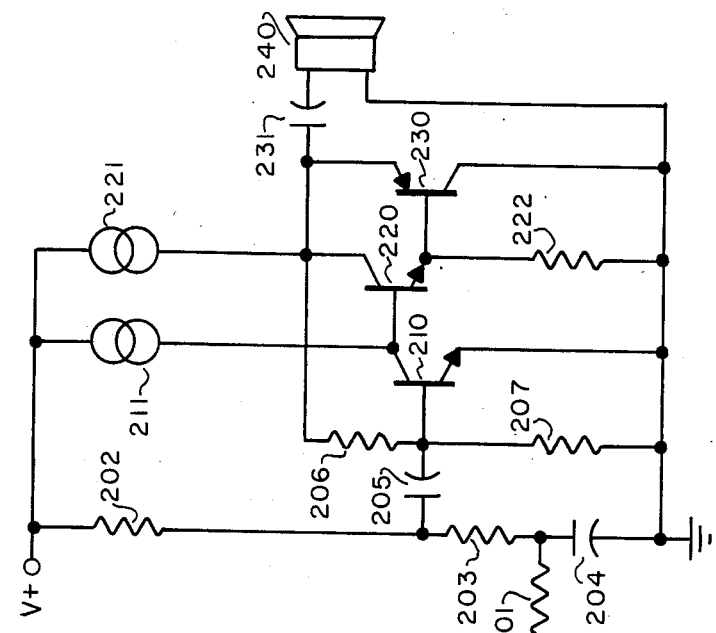
FIG. 2 is a schematic circuit diagram of the receive circuitry included in the present invention.

Referring now to FIG. 2 which shows the receive circuitry. The basic portion of this circuit consists of transistors 210, 220 and 230 which in combination form a high open-loop-gain amplifier. The gain of the amplifier is sufficiently high so as to permit resistors 202, 203 and 206 to precisely establish the closed-loop-gain. The base terminal of transistor 210 is the virtual ground and summing junction for the circuit. Capacitors 205 and 231 are coupling capacitors used to block direct current. Current source 211 provides a high impedance active load for the collector of transistor 210 which is necessary to achieve a large voltage gain with the present amplifier configuration. Current source 221 isolates the 150 Ohm receiver impedance from the low amplifier output impedance of the telephone line. This isolation is essential as it prevents severe inefficient loading which results in signal power reduction.

In a transformer type of telephone circuit the receiver impedance would be matched to the telephone line impedance by selection of the appropriate winding turns ratio. In this manner, the current source helps to eliminate the transformer from the design. Resistors 207 and 222 establish the amplifier DC output voltage to slightly above that of a single silicon diode's forward voltage, to maintain all of the transistors properly biased. The present amplifier design is such that it will operate at less than a 2 volt supply voltage, thus assuring operation on low voltage loops and also when associated extension phones are taken off-hook.

The present circuit also provides precise control of sidetone cancellation which is a balance function. This precision results from the summation weights of the transmit and sidetone signals as determined exactly by resistors 202 and 203. Resistor 202 is also chosen to assist in providing the correct terminal AC impedance of approximately 600 Ohms for the present telephone circuit. In a preferred embodiment of the present invention, resistor 202 has a value of 82,000 Ohms and in combination with resistors of specifically chosen values included in the transmit and pulse dialer circuitry shunt the line providing the desired terminal AC impedance.

Figure 3:
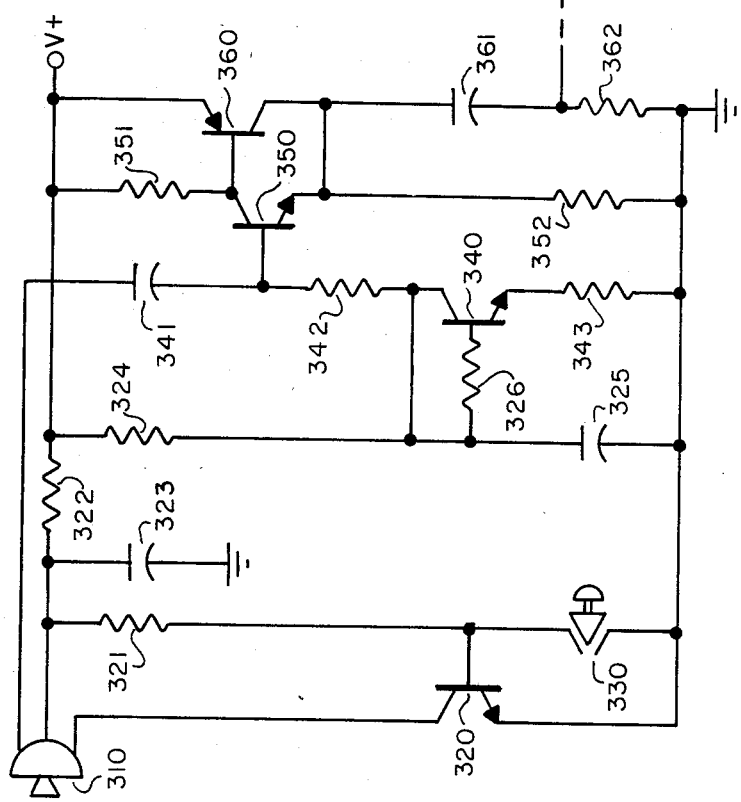
FIG. 3 is a schematic circuit diagram of the transmit circuitry included in the present invention.

FIG. 3 shows the transmit circuitry. The basic transmit amplifier structure consists of transistors 340, 350 and 360. Resistors 324, 343 and 352 in combination with transistors 340 and 350 form a current source mirror. That is, the DC collector current of transistor 350 is approximately equal to the bias current through resistor 324. Transistor 360 serves as a buffer by supplying most of the current through resistor 352 (a low value resistor). The resulting configuration presents a high impedance to the telephone line and prevents shunting of signal currents. Transistors 350 and 360 with resistors 352, 262 and capacitors 361 and 341 form a high transconductance AC amplifier. A small voltage signal input through capacitor 341 produce a relatively large signal current in the telephone loop.

Resistor 342 presents a moderate impedance to the microphones output. Resistor 326 matches resistor 342 to improve tracking performance of the current mirror. Capacitor 325 shunts AC current that flows through resistor 324 to prevent signal feedback to the base of transistor 350. (Any such signal would reduce the transmit circuit output impedance.) Resistor 351 assures that transistor 350 will be biased up to the correct DC operating point. Resistor 322 isolates the microphone supply voltage filter capacitor 323 from the telephone terminals with a specific amount of impedance. This resistor is one of the telephone impedance establishing elements. The other telephone AC impedance establishing element of the transmit circuitry is resistor 324. In the present embodiment resistor 322 has a value of 1100 Ohms while resistor 324 has a value of 2400 Ohms. As noted above these resistors in combination with selected fixed resistors included in the receive and pulse dialer circuitry determine the terminal AC impedance of the present telephone circuit. Transistor 320, resistor 321 and the normally open mute switch 330 provide the telephone user with the option of momentarily disabling voice transmission as a convenience feature.

Figure 4:
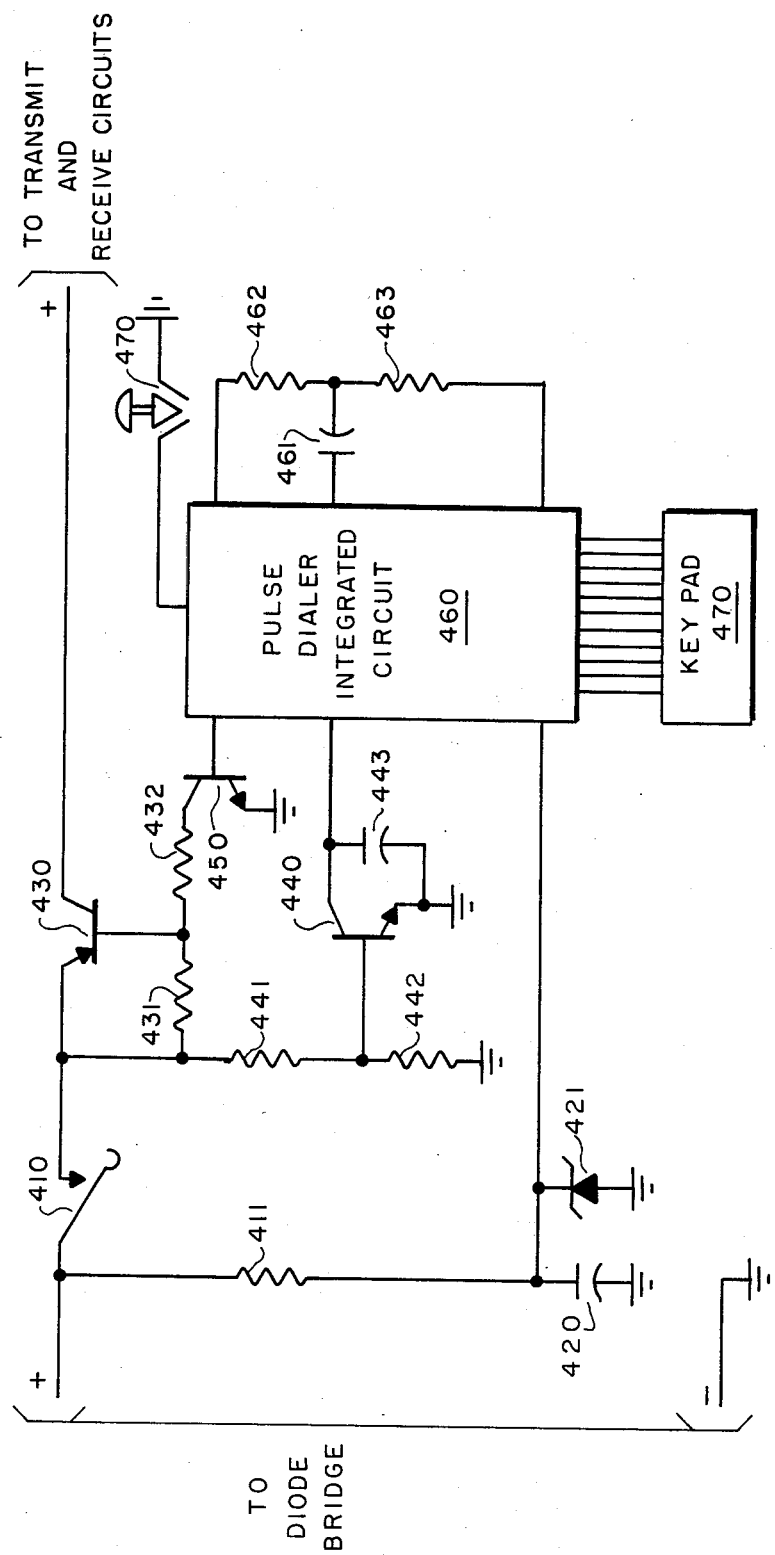
FIG. 4 is a combination block and schematic circuit diagram of a dialer circuit in accordance with the present invention.

The pulse dialer portion of the present telephone circuitry is pictured in FIG. 4. The key element in this circuitry is the pulse dialer integrated circuit 460 which is a commercialy available intergrated circuit element manufactured by Mostek Coropration and identified as their part number MK50992. Integrated circuit 460 is a CMOS device which responds to switch closures of an associated key pad 470 whose configuration may take any well known form, (the details of which do not form a portion of the present invention), which cause the pulse dialer integrated circuit 460 to produce the appropriate sequence of loop current interruptions for dialing purposes. Also, when the re-dial button 470 is operated, the last number dialed will then be re-dialed using information stored in the memory contained within the pulse dialer integrated ciruit 460. This memory is effective both during the off-hook and on-hook conditions. When on-hook the telephone line charges the supply capacitor 420 thrugh high value resistor 411. The zener diode 421 prevents the supply voltage from exceeding the rating of the integrated circuit 460. The loop circuit is switched on and off by transistor 430 and resistor 432 under control of pulse dialer circuit 460. Transistor 440 serves as an on-hook condition detector. The response of this detector is delayed by capacitor 443 to prevent spurious operation. The detector is needed to reset the re-dial function upon the telephone going on-hook. Resistors 441, 442 and 431 are DC biasing elements for the associated transistors 440 and 450. Resistors 462, 463 and capacitor 461 establish the frequency of an oscillator included within the pulse dialer which drives all of the timing functions of the pulse dialer integrated circuit. Resistor 432 which in the present embodiment has a value of 2400 Ohms is also one of the resistors which determine the AC impedance value of a telephone circuit embodying the present invention.

Figure 5:
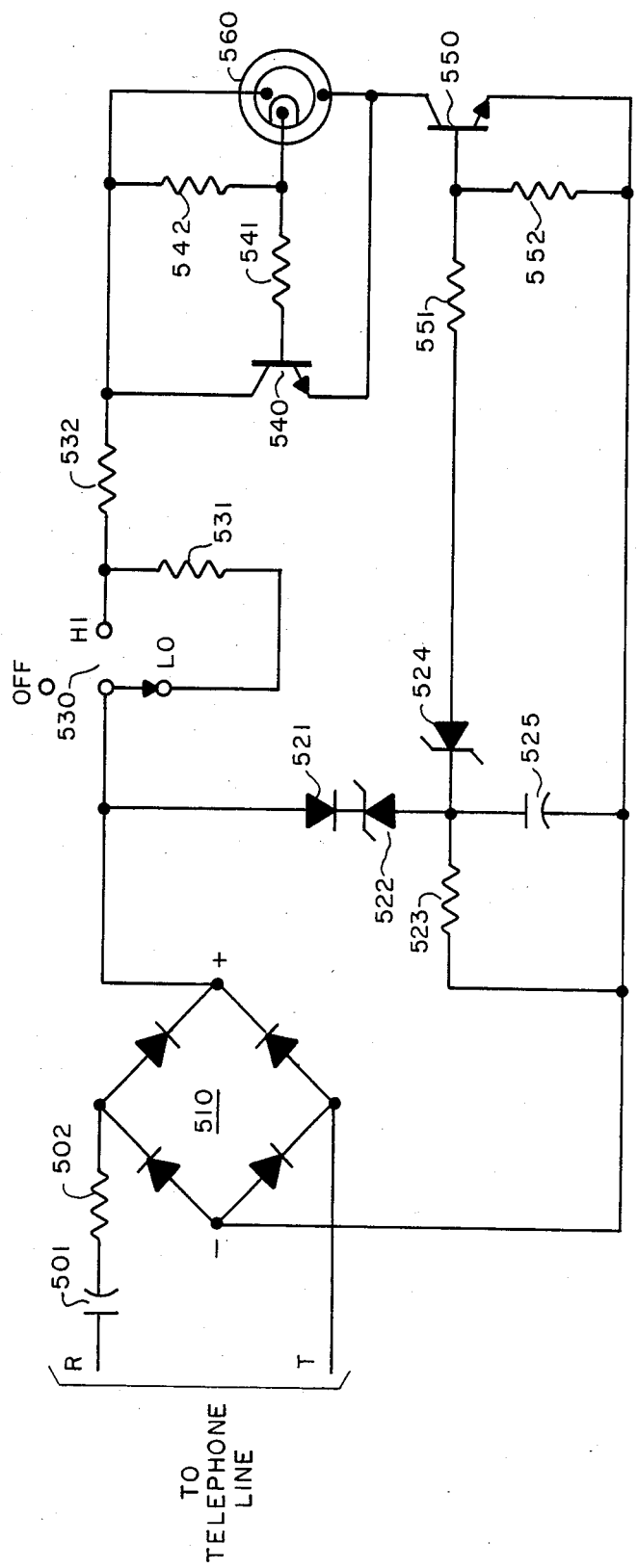
FIG. 5 is a schematic circuit diagram of a ringer circuit in accordance with the present invention.

FIG. 5 discloses the electronic tone ringer circuitry. The basic portion of this circuit is a 2800 Hz oscillator which includes transistor 540 and piezoelectric transducer 560. The frequency of oscillation of this oscillator circuit is determined by the self resonant frequency of the piezoelectric element. This self resonant frequency is influenced by the method of mounting the piezoelectric element and to a lesser extent by the design of an associated Helmholtz resonator to which it is attached. The essential oscillatory gain and phasing is provided by transistor 540 in conjunction with a feedback tab on the piezoelectric element which is connected through resistor 541 to the base of transistor 540. This oscillator turns on whenever a voltage is supplied between the junction of resistors 531 and 532 and the emitter of transistor 540. Capacitor 501, resistor 502 and the diode bridge 510 convert incoming AC ringing signals when supplied across the Tip and Ring (T and R terminals of the telephone) to a DC voltage available for operation of the oscillator. However, transistor 550 must be turned on before this DC voltage is available for application to the oscillator. Transistor 550 and diodes 521, 522 and 524 along with resistors 523, 551 and 552 and capacitor 525 constitute a turn-on delay circuit which prevents "dial-tapping." Dial-tapping is a series of short pulses which may appear across the terminal of a telephone when "on-hook" as a result of someone dialing on an extension telephone. With this circuit, the start of oscillation is delayed by the charging time of capacitor 525. Resistor 523 discharges capacitor 525 after the input voltage subsides. This re-sets the turn-on delay feature. The switch 530 corrects the supply feed resistance to the tone oscillator circuit to provide two different tone output levels. Also an open circuit (off) position is available. Different than most call alerting configurations employed in the prior art that employ tone ringer circuits, no tone interrupting oscillator is employed, since the osillator starts and stops as the individual ringing cycles are available. This frequent starting and stopping action provides effective tone interruptions.

A better understanding of the subscriber telephone circuit of the present invention may be had by reference to the following description of operation taken in connection with FIGS. 1 through 5 inclusive of the drawings. Referring first to FIG. 1, the ringer circuit 500 which is directly connected across the leads connected to terminals T and R which extend to the telephone line, offers high AC and DC impedance until such time as a ringing voltage appears across the terminals. At this time, the AC impedance will drop, allowing the oscillator portion of ringer circuit 500 consisting of transistor 540 and piezoelectric transducer 560 and associated components, to absorb power from the line and produce an acoustical alerting signal. The acoustical tone will be interrupted by voltage magnitude dips of the incoming ringing signal. Frequency of the interruption is equal to twice the frequency of the incoming ringing signal.

The pulse dialer circuit 400 draws a small amount of current from the line whenever the telephone is connected to the line. This is taken through resistor 411 shown in FIG. 1. This current keeps the re-dial memory included in the integrated circuit 460 shown in FIG. 4, operative at all times. Thus any telephone number stored in the memory of the pulse dialer integrated circuit 460 will be dialed when the re-dial key 470 is depressed. Dial pulses from this device operate the electronic switch comprised of transistor 430 which provides loop disconnect signalling. When the re-dial feature is not used, digits are pulsed in response to key pad key closures manually initiated at key pad 470 wherein the subscriber utilizing circuitry of the present invention is able to dial a new number.

When the subscriber removes the handset from the hookswitch 410 going off-hook, closure of the hookswitch applies loop voltage to the receive circuit 200 and the transmit circuit 300, the amplifier circuitry contained therein quickly stablizes at the operating DC bias. Subsequently, any sound pressure in the microphone 310 will produce a corresponding signal voltage at the terminals T and R of the telephone circuit. Also, any signal arriving at the telephone from an associated telephone office or other switching center, will be enhanced by the amplifier included in receive circuit 200, to produce a corresponding sound pressure at the output of receiver 240.

Referring now to FIG. 2 the receive signal is applied through resistor 202 through the summing junction at the base of transistor 210. An amplified receive signal appears at the emitter of transistor 230 and through capacitor 231 is applied to drive receiver 240. The receive gain of the included amplifier circuitry is established by resistors 202 and 206. Since a transmit signal will find its way to the receive amplifier through resistor 202 (sidetone) a controlled amount of transmit signal is subtracted via resistors 201 and 203 from the sidetone signal to prevent undesirable high sidetone levels at the receiver 240.

In the transmit circuit shown in FIG. 3, the electret microphone 310 produces a few millivolts of output at normal voice level. This small signal is coupled through DC blocking capacitor 341 to the base of transistor 350. Most of the base signal also appears at the emitter since the device is used in an emitter follower configuration. The result is a relatively large signal current flow in resistor 352. With this large current developed, the 600 Ohm impedance telephone is able to effectively drive the telephone line. The voltage developed across resistor 362 is used by the receive circuit for sidetone cancellation; the output being taken between resistor 362 and capacitor 361 and extended through resistor 201 of FIG. 2. In the microphone portion of the circuit, capacitor 323 supplies a filtered voltage to the microphone's power supply terminal.

In the pulse dialer circuit shown in FIG. 5, when the telephone goes off-hook, hookswitch contacts 410 close applying a DC voltage to resistors 441 and 442. This in turn causes transistor 440 to saturate, producing a low logic level at the collector and enabling the pulse dialer integrated circuit 460 to allow re-dial of the number stored in its internal memory or the dialing of a new number. When the telephone goes back on-hook, the collector of transistor 440 rises to disable the pulse dialer functions, except the memory included therein is sustained.

During out pulsing, a rectangular voltage wave form is generated by the pulse dialer integrated circuit 460 and applied to the base of transistor 450 which in turn drives transistor 430, (the loop current interrupt switch). Both transistors 450 and 430 are high voltage devices which can withstand voltage transients that result from the breaking of an inductive circuit. The capacitor 420 charges either during on-hook or off-hook conditions to supply power to the pulse dialer integrated circuit 460. The oscillator which is included in the pulse dialer circuit has a time constant determined by resistors 462 and 463 and capacitor 461 which operate only during dialing. This arrangement minimizes power consumption. Digit selection occurs as indicated previously when the key pad closure contacts are made at the key pad 470 and the output thereof is extended to the pulse dialer integrated circuit 460 as shown in FIG. 4.

The electronic tone ringer shown in FIG. 5 operates in response to the application of an alternating current (AC) ringing voltage applied across terminals T and R. This signal is rectified by full wave diode bridge circuit 510. The resulting DC voltage is of sufficient magnitude to turn on zener diode 522 causing capacitor 525 to start charging. When the voltage across capacitor 525 reaches about seven (7) volts, transistor 550 turns on, in turn supplying operating voltage to the 2800 Hz tone oscillator. This assumes that the ringer volume switch is in a "low" or "high" position. The time required to charge capacitor 525 delays any output from the alerting device to prevent audible response to transient voltage spikes which may occur across the telephone terminals.

As noted previously the telephone circuit of the present invention provides a terminal AC impedance of approximately 600 Ohms under all loop conditions. This stable impedance is established by selecting the value of resistor 202 in the receive amplifier circuitry, resistors 322 and 324 in the transmit circuitry and resistor 432 in the pulse dialer circuitry. The combination of the values selected relative to the high AC impedance of the transmit and receive amplifiers determines the AC impedance of the telephone circuit as presented to the telephone line.

While but a single embodiment of the present invention has been shown it will be obvious to those skilled in the art that numerous modifications may be made without departing from the spirit and scope of the present invention which shall be limited only by claims appended hereto.

What is claimed is:

1. A subscriber's telephone circuit connected to a telephone line, comprising: transmit means including output circuit connections to said telephone line; receive means including input circuit connections from said telephone line and pulse dialing means connected to said telephone line; said dialing means, receiving means and transmit means each including fixed resistance means of selected specific values; and said fixed resistance means in said dialing means, said receiving means and said transmit means shunting said telephone line and in combination forming a constant AC impedance to said telephone line.

2. A subscriber's telephone circuit as claimed in claim 1 wherein: said transmit means comprise an amplifier including an input connected to microphone and an output connected to said telephone line.

3. A subscriber's telephone circuit as claimed in claim 2 wherein: said transmit amplifier includes a plurality of resistors which in combination with the fixed resistance means in said dialing means and in said receiving means form said constant impedance to said telephone line.

4. A subscriber's telephone circuit as claimed in claim 1 wherein: said receive means comprise a receiver amplifier including an input connected to said telephone line and an output connected to a telephone receiver.

5. A subscriber's telephone circuit as claimed in claim 4 wherein: said receiver amplifier further includes a resistor which in combination with said fixed resistance means included in said dialing means and in said transmit means form a constant impedance to said telephone line.

6. A subscriber's telephone circuit as claimed in claim 1 wherein: said pulse dialing means includes a resistor which in combination with said fixed resistance means included in said receiving means and in said transmit means form a constant impedance to said telephone line.

7. A subscriber's telephone circuit as claimed in claim 1 wherein: said transmit means include a transmit amplifier including a plurality of resistors; said receive means include a resistor and said pulse dialing means include a resistor, said resistors included in said transmit means, said receive means and said pulse dialing means in combination forming said constant impedance to said telephone line.

* * * * *